A. W. PORTER.
Post-Hole Digger.
No. 29,518. Patented Aug. 7, 1860.
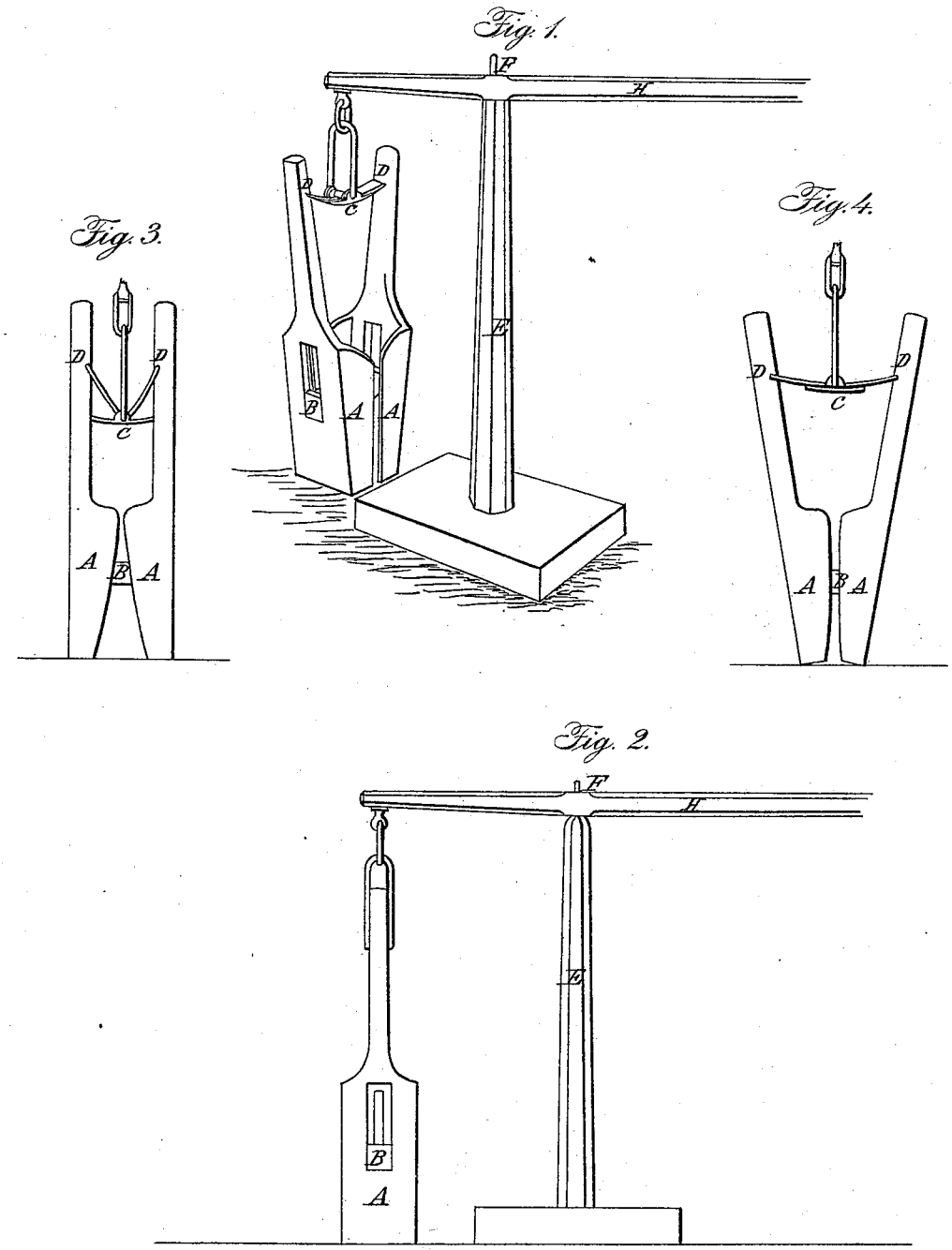
Witnesses:
J. C. Howells
Henry S. Graber
Inventor:
A. W. Porter

UNITED STATES PATENT OFFICE.

A. W. PORTER, OF ST. JOHNSVILLE, NEW YORK.

IMPROVEMENT IN MACHINES FOR DIGGING POST-HOLES.

Specification forming part of Letters Patent No. 29,518, dated August 7, 1860.

*To all whom it may concern:*

Be it known that I, ANCEL W. PORTER, of St. Johnsville, in the county of Montgomery and State of New York, have invented a new and Improved Machine for Digging Post-Holes; and I do hereby declare the following to be a full and exact description thereof, reference being had to the accompanying drawings, and to the letters of reference marked thereon.

Figure 1 is a perspective elevation of my machine. Fig. 2 is an end elevation of the same. Fig. 3 represents the position of the digger before entering the ground. Fig. 4 represents the digger after entering the ground and then being lifted to the surface.

Similar letters of reference indicate like parts in all the drawings.

The nature and object of my invention consists in the use of two or more adjustable spades or shovels so arranged as to successively or simultaneously enter the ground, and upon being withdrawn carry with them the earth that they inclose, thus digging a post-hole of suitable shape and dimensions.

To enable others skilled in the art to make and use my invention, I will proceed to describe its construction and operation.

I construct my post-hole-digging machine of iron or any suitable material, the blades of the spades or shovels being slotted, so as to admit of their being united by a shackle-bar. On the handles of the spades or shovels are suitable notches in which to secure the ends of a toggle-joint, which serves by the aid of a lever to lift the spades or shovels out of the ground or to place them in any required position, all of which can be plainly seen by reference to Figs. 1, 2, 3, and 4.

In order to operate the digger, the blades of the spades or shovels A are placed in a perpendicular position, but parallel to each other. They are then struck successively with sledges or mauls, which causes them to penetrate the ground. The shackle-bar B, resting upon the ground, traverses the entire distance of the slot in the spades. The spades being driven into the ground the required depth, the toggle-joint C is secured to the handles of the spades at D, and the spades are lifted from the ground, with the earth they inclose, by operating the lever H, which is secured to the fulcrum E by the pivot F. The action of the toggle-joint upon the handles of the spades diverge them from each other, causing the blades to converge in such a manner as effectually to secure the earth which they inclose while in the act of being operated by the lever H.

What I claim as my invention, and desire to secure by Letters Patent, is—

The slotted spades or shovels A, as secured by the shackle-bar B and operated by the toggle-joint C, substantially as set forth, and for the purpose specified.

A. W. PORTER.

Witnesses:
J. C. HOWELLS,
HENRY I. GREIBER.